(12) United States Patent
Saadat

(10) Patent No.: US 9,229,946 B2
(45) Date of Patent: Jan. 5, 2016

(54) METHOD AND APPARATUS FOR PROCESSING SEARCH REQUEST FOR A PARTITIONED INDEX

(75) Inventor: Saied Saadat, Watertown, MA (US)

(73) Assignee: Nokia Technologies Oy, Espoo (FI)

( * ) Notice: Subject to any disclaimer, the term of this patent is extended or adjusted under 35 U.S.C. 154(b) by 120 days.

(21) Appl. No.: 12/861,574

(22) Filed: Aug. 23, 2010

(65) Prior Publication Data

US 2012/0047164 A1 Feb. 23, 2012

(51) Int. Cl.
*G06F 17/30* (2006.01)

(52) U.S. Cl.
CPC .... *G06F 17/30094* (2013.01); *G06F 17/30321* (2013.01)

(58) Field of Classification Search
CPC ............... G06F 17/30094; G06F 17/30321
USPC ....................................................... 707/769
See application file for complete search history.

(56) References Cited

U.S. PATENT DOCUMENTS

| | | | |
|---|---|---|---|
| 5,864,840 A | | 1/1999 | Leung et al. |
| 6,032,143 A | | 2/2000 | Leung et al. |
| 7,174,346 B1 * | | 2/2007 | Gharachorloo et al. ............... 1/1 |
| 7,254,580 B1 * | | 8/2007 | Gharachorloo et al. ............... 1/1 |
| 7,685,109 B1 | | 3/2010 | Ransil et al. |
| 7,756,857 B2 * | | 7/2010 | Wan ............................. 707/715 |
| 2003/0018621 A1 | | 1/2003 | Steiner et al. |
| 2004/0148293 A1 * | | 7/2004 | Croisettier et al. ........... 707/100 |
| 2005/0027692 A1 * | | 2/2005 | Shyam et al. ..................... 707/3 |
| 2005/0251524 A1 | | 11/2005 | Shukla |
| 2008/0120273 A1 | | 5/2008 | Ramesh et al. |
| 2009/0157666 A1 | | 6/2009 | Gehrke et al. |
| 2010/0023477 A1 | | 1/2010 | Thiebaut-George |
| 2010/0088304 A1 | | 4/2010 | Jackson |
| 2011/0145223 A1 * | | 6/2011 | Cormode et al. ............. 707/722 |

FOREIGN PATENT DOCUMENTS

| | | |
|---|---|---|
| CN | 101071442 A | 11/2007 |
| CN | 101395602 A | 3/2009 |
| EP | 1 677 208 A1 | 7/2006 |
| WO | WO 2005/076160 A1 | 8/2005 |

OTHER PUBLICATIONS

International Search Report for related International Patent Application No. PCT/IB2011/053703 dated Dec. 12, 2011, pp. 1-4.
International Written Opinion for related International Patent Application No. PCt/IB/053703 dated Dec. 12, 2011, pp. 1-7.
Office Action for Chinese Application No. 2011800407385 dated Apr. 8, 2015.

\* cited by examiner

*Primary Examiner* — Joshua Bullock
(74) *Attorney, Agent, or Firm* — Alston & Bird LLP

(57) ABSTRACT

Techniques for enhanced processing of search requests directed to a partitioned index include receiving a request for a search of an index. The index is partitioned across a plurality of nodes in communication. The method also comprises determining whether the request is deterministic. The method further comprises determining a number of responses to request from at least one of the plurality of nodes based on whether the request is deterministic.

20 Claims, 9 Drawing Sheets

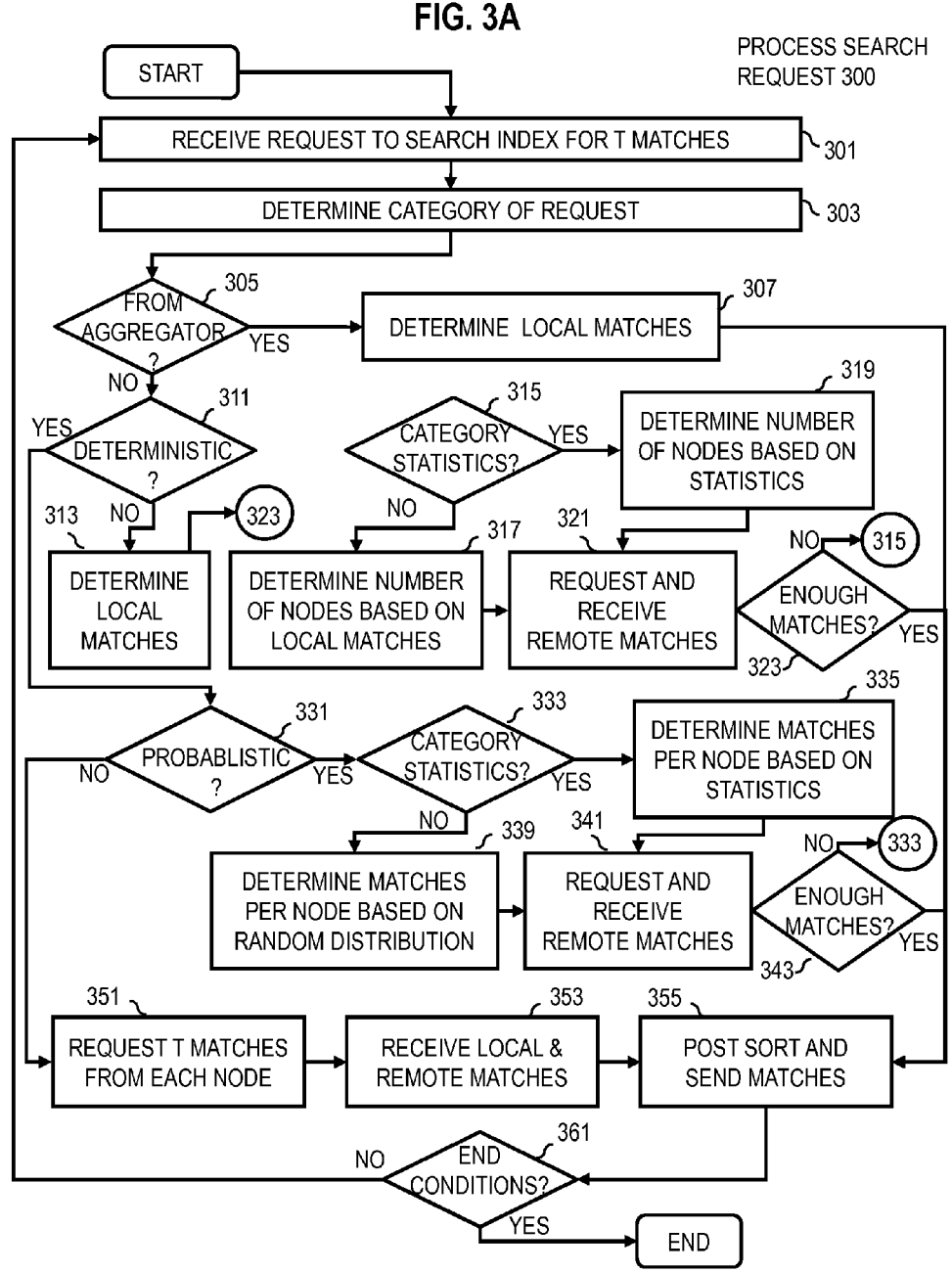

METHOD AND APPARATUS FOR PROCESSING SEARCH REQUEST FOR A PARTITIONED INDEX

BACKGROUND

Service providers (e.g., wireless, cellular, etc.) and device manufacturers are continually challenged to deliver value and convenience to consumers by, for example, providing compelling network services. Important differentiators in the industry are application and network services as well as capabilities to support and scale these services. In particular, these applications and services can include accessing and managing data utilized by network services. These services entail managing a tremendous amount of user data, such as terabytes of data available through online stores for books, audio and video or online storage of personal emails, pictures, audio and video for a large number of subscribers. To search these large data holdings, indices are generated that associate data objects like books and images and files with searchable fields, such as dates and subject matter. The indices themselves can become quite large. Some services store such indices distributed among many network nodes so that each node maintains an index of a size that can be searched in a reasonably short time. However the indices are partitioned, some searches still involve most or all partitions of the index, and can consume large amounts of computational power and network bandwidth, with inherent delays in responding to individual search requests.

Some Example Embodiments

Therefore, there is a need for an approach for enhanced processing of search requests directed to a partitioned index, which does not suffer all the disadvantages of prior art approaches.

According to one embodiment, a method comprises receiving a current request for a search of an index. The index is partitioned across a plurality of nodes in communication. The method also comprises determining whether the request is deterministic. The method further comprises determining a number of responses to request from at least one of the plurality of nodes based on whether the request is deterministic. In some embodiments, the request is deterministic if no more than a predetermined number of sets of index entries at least substantively satisfies the request, for example if only one set of index entries substantively satisfies the request.

According to another embodiment, a method comprises facilitating access to at least one interface configured to allow access to at least one service. The at least one service is configured to perform at least receiving a request for a search of an index. The service is further configured to determine whether the request is deterministic. The service is further configured to determine a number of responses to request from at least one of the plurality of nodes based on whether the request is deterministic.

According to another embodiment, an apparatus comprises at least one processor, and at least one memory including computer program code, the at least one memory and the computer program code configured to, with the at least one processor, cause, at least in part, the apparatus to receive a request for a search of an index, wherein the index is partitioned across a plurality of nodes in communication. The apparatus is also caused to determine whether the request is deterministic. The apparatus is further caused to determine a number of responses to request from at least one of the plurality of nodes based on whether the request is deterministic.

According to another embodiment, a computer-readable storage medium carries one or more sequences of one or more instructions which, when executed by one or more processors, cause, at least in part, an apparatus to receive a request for a search of an index, wherein the index is partitioned across a plurality of nodes in communication. The apparatus is also caused to determine whether the request is deterministic. The apparatus is further caused to determine a number of responses to request from at least one of the plurality of nodes based on whether the request is deterministic.

According to another embodiment, an apparatus comprises means for performing the steps of one of the above methods.

According to another embodiment, a computer program product includes one or more sequences of one or more instructions which, when executed by one or more processors, cause an apparatus to at least perform the steps of one of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3A is a flowchart of a process for enhanced processing of search requests directed to a partitioned index, according to one embodiment;

DESCRIPTION OF SOME EMBODIMENTS

Examples of a method, apparatus, and computer program are disclosed for processing search requests directed to a partitioned index. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term partition refers to a data structure holding a portion of a larger data set. The data set may hold any kind of data, from subscriber data to contents of a music store, book store, video store, art store, game store or any other source of digital content on a communications network. The term index refers to a data structure with at least one field that can be searched. In some embodiments, the entire contents of a store are not arranged in an index, but a subset of the information is placed into a much smaller index that is more efficient to search. For example a bookstore could make every page of every book searchable and therefore an index as defined herein. However, it is often more efficient to pull just some fields that are searchable into an index. For example, a few fields that indicate the title, author, publication date, copyright date, ISBN number, a review and a rating are sufficient for a searcher to determine whether a book should be ordered, and every page of the book need not be included as a field of the index. Although various embodiments are described with respect to a partitioned index that points to physical or digital books that can be ordered from a bookstore, it is contemplated that the approach described herein may be used with other indices for other digital content or physical objects.

Figure 1A:
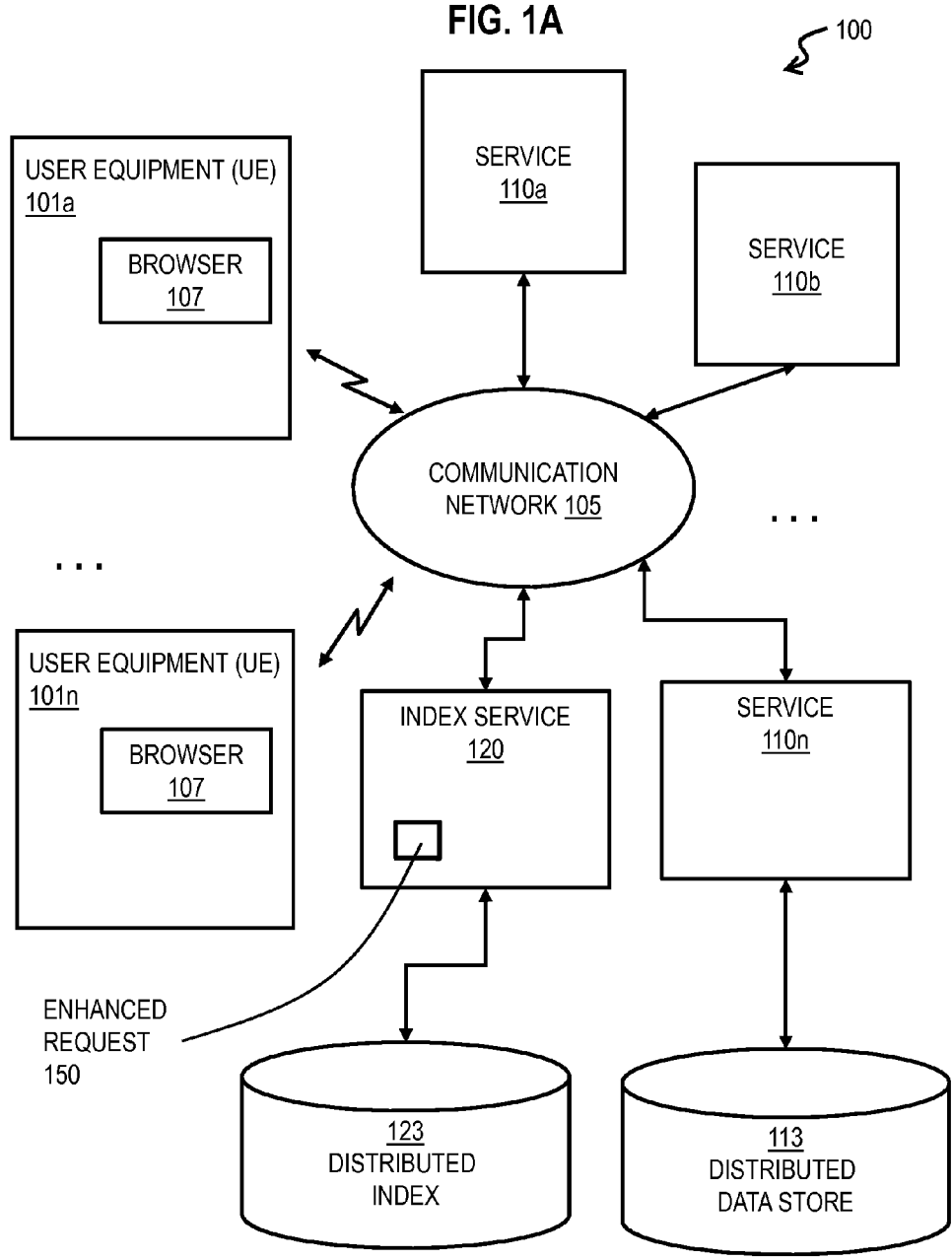
FIG. 1A is a diagram of a system capable of enhanced processing of search requests directed to a partitioned index, according to one embodiment.

FIG. 1A is a diagram of a system capable of enhanced processing of search requests directed to a partitioned index, according to one embodiment. Users of user equipment (UE) 101a through UE 101n (collectively referenced hereinafter as UE 101) access any of network services 110a, 110b through 110n (collectively referenced hereinafter as network services 110).

The network services 110 acquire and store large amounts of information in one or more data storage media called data stores hereinafter. For example, service 110n maintains distributed data store 113. Because such data stores can become very large, with terabytes of data (1 terabyte, TB, $=10^{12}$ bytes, where one byte=8 binary digits called bits), it becomes inefficient to search through all this data to find a particular entry. As a consequence, a considerably smaller index of important fields for searching is formed and managed by an index service 120. However, even the index of a few important fields per entry can includes billions of entries. To distribute the computational load of maintaining and searching the index, the index is partitioned; and each partition is placed on a different node of a distributed index 123 that includes multiple nodes. For example, for an index holding two billion ($2 \times 10^9$) entries, each of 200 nodes handles a partition of 10 million index entries. When a request to search the index is received, each node of the distributed index searches its own partition for index entries that satisfy the search criteria; and the results are aggregated by the index service 120.

However, searching the partition at every node can be wasteful, because many requests can be satisfied by the index entries on only a few of the nodes. Not only does it involve nodes in doing searches that are not needed to substantively satisfy the request, but the aggregator is forced to handle and sort through all the responses (e.g., the matches) to form the response request. For example, if a request is received for 100 titles including the phrase "Civil War" sorted by date, and if each node averages about 50 such titles, the request could be satisfied by two average nodes. Yet 200 nodes will respond to the request, yielding 10,000 titles. The computational load and bandwidth consumed by 198 nodes going through up to ten million entries are wasted. At the same time, the aggregator must pick through or sort by date 10,000 titles to pick 100 to substantively satisfy the request, wasting computational resources on the aggregator, e.g., index service 120.

To address this problem, a system 100 of FIG. 1A introduces the capability to enhance processing of search requests directed to one or more partitioned indices. According to various embodiments, the index service 120 includes an enhanced request module 150. The enhanced request module 150 determines when a request is deterministic and should be processed by all nodes, and when a request is not deterministic and should be processed first by a few nodes that are likely to substantively satisfy the request. In some embodiments, the enhanced request module 150 also offers the capability to substantively satisfy the deterministic request with high confidence but with many fewer operations than brute force approaches.

As shown in FIG. 1A, the system 100 comprises user equipment (UE) 101 having connectivity to network services 110 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

At least one network service 110 has access to an index service 120 to build and maintain a partitioned index for that service. In some embodiments, each network service 110 has its own index service. In some embodiments, a standalone index service 120 offers indexing services for multiple other network service 110. The index service 120 receives each index entry from a network service 110 and sends it to one partition of the distributed index 123 for storage. The index service 120 also receives each search request from a network service 110 and selects at least one node of the distributed index 123 to process the search request. The node selected is varied for different requests to distribute the load of processing requests.

By way of example, the UE 101 and network services 110 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Processes executing on various devices, often communicate using the client-server model of network communications, widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. A well known client process available on most devices (called nodes) connected to a communications network is a World Wide Web client (called a "web browser," or simply "browser") that interacts through messages formatted according to the hypertext transfer protocol (HTTP) with any of a large number of servers called World Wide Web (WWW) servers that provide web pages.

In the illustrated embodiment, each UE 101 includes a browser 107 to communicate with a WWW server included within each network service 110. In some embodiments, a separate service client (not shown) for one or more of the network services 110 is included on one or more UE 101.

Figure 1B:
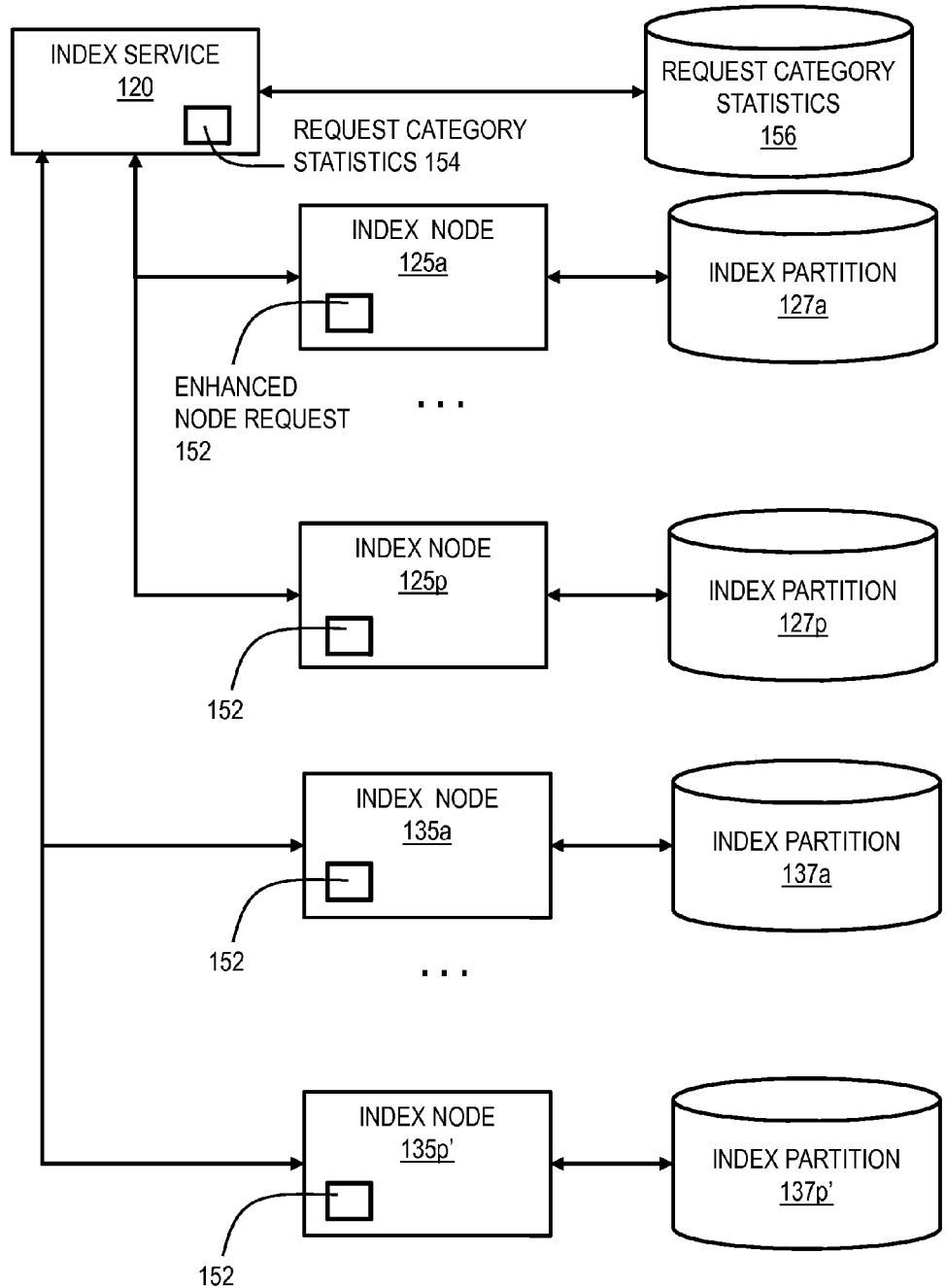
FIG. 1B is a diagram of the components of index service distributed indices, according to one embodiment.

FIG. 1B is a diagram of the components of index service distributed indices, according to one embodiment. By way of example, the distributed index 123 includes two or more nodes, each with one or more components comprising an enhanced node request module 152. In some embodiments, the index service 120 includes a request category statistics module 154 that maintains a request category statistics data structure 156. One or more of these components provide enhanced processing of search requests directed to a partitioned index. It is contemplated that the functions of these components may be combined in one or more components or performed by other components of equivalent functionality on the nodes depicted or different nodes. For example, in some embodiments, some or all the functions of the request category statistics module 154 are performed by the enhanced node request modules 152 together, the enhanced node request modules 152, request category statistics module 154 and data structure 156 constitute the enhanced request module 150 depicted in FIG. 1A.

In the illustrated embodiment, the distributed index 123 includes index node 125*a* through index node 125*p* (collectively referenced hereinafter as index nodes 125) for a first index, and includes index node 135*a* through index node 135*p*' (collectively referenced hereinafter as index nodes 135) for a second index, where p indicates the number of partitions in the first index and p' indicates the number of partitions in the second index. In other embodiments distributed index 123 includes index nodes for more or fewer indices. Each index node 125, 135 maintains and searches the index entries in at least one index partition for at least one index. In the illustrated embodiment, index nodes 125*a* through index node 125*p* operate on the index entries in index partition 127*a* through 127*p*, respectively (collectively called index partitions 127 hereinafter). Similarly, index nodes 135*a* through index node 135*p*' operate on the index entries in index partition 137*a* through 137*p*', respectively (collectively called index partitions 137 hereinafter).

When a search request is received at the index service for searching one of the indices, the request is directed to one of the index nodes for the requested index. The index node that receives the request is called an aggregator node and is responsible for substantively satisfying the request with index entries from any of the partitions. The index service 120 distributes multiple requests across the different index nodes so that each serves as the aggregator node for at least some requests. This serves to distribute the load of responding to search requests. The aggregator node determines what index entries to request from the other index nodes for the index, if any. The aggregator receives the matching index entries (called matches herein) from the other index nodes, if any, and combines the matches into one response that is sent to the requesting network service 110 via the index service process 120.

According to various embodiments, each index node 125, 135 includes an enhanced node request module 152 for processing such search requests. The decision of how many entries to request from each of which index nodes is based on whether the request is deterministic or not. A search request is deterministic if no more than a predetermined number of sets of index entries substantively satisfies the search request. For example, in an index of books available for sale, a request may be for the 50 most recently published books with "Civil War" in the title. This request is a deterministic request, even if the predetermined number of sets that render a request deterministic is one. Only the one set with the 50 titles most recently published satisfy this request. Similarly, a request may be for 8 of the 10 most recently published books with "Civil War" in the title. Such a request is substantively satisfied by a number of sets (10 items selected 8 at a time, about equal to 10 factorial divided by 8 factorial, 10!/8!=10*9=90 sets). If the predetermined number of sets that makes a request deterministic is 100, then this request is deterministic. In contrast, a request for 50 books with "Civil War" in the title arranged in publication order is not deterministic; any 50 books of the hundreds of books in the index with "Civil War" in the title can be arranged in publication date order and satisfy this request. Many thousands of combinations would satisfy such a request; and, even with a predetermined number of sets of 100, this request would not be deterministic. For purposes of illustration, it is assumed in the following that the predetermined number of sets of index entries is one for a request to be considered deterministic. An index entry that satisfies all search criteria is said to be a match of the search. A response to a search request may include a match or an entry that is an approximate match (satisfies almost all search criteria).

Thus, the system 100 includes receiving a current request for a search of an index, wherein the index is partitioned across a plurality of a number P of nodes in communication over a network. The system 100 further includes determining whether the current request is deterministic, wherein a search request is deterministic if only one set of index entries completely satisfies the search request. And, the system 100 includes determining a number K of matches to request from each of a number N of nodes of the plurality of nodes based on whether the current request is deterministic.

Although processes and data structures are shown in FIG. 1A and FIG. 1B as integral blocks in a particular order on particular nodes of the communication network for purposes of illustration, in other embodiments, one or more processes or data structure or portions thereof are arranged in a different order on the same, more or fewer nodes of the network or in one or more databases or are omitted or one or more additional processes or data structures are included.

Figure 2A:
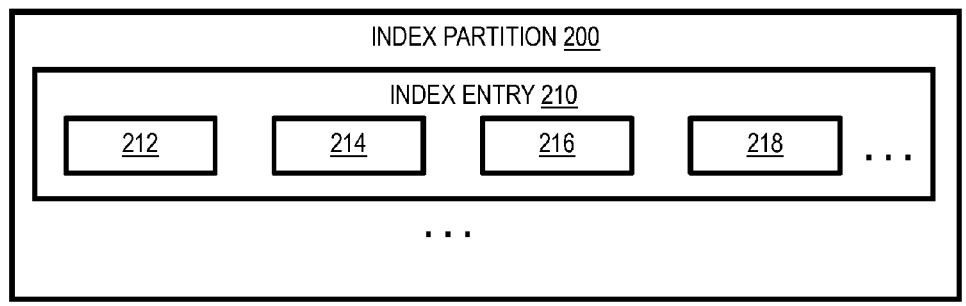
FIG. 2A is a diagram of an index partition data structure, according to an embodiment.

FIG. 2A is a diagram of an index partition data structure 200, according to an embodiment. The index partition data structure 200 is a particular embodiment of one the index partitions 127 or 137 of one index. The index partition data structure 200 includes multiple index entries as indicated by index entry 210 and ellipsis. Each index entry 210 includes two or more fields, such as fields 212, 214, 216, 218 and others indicated by ellipsis, collectively referenced as index fields 212. Each field holds data that indicates a value for a corresponding parameter. One or more of the fields 212 are searchable by the network service 110 for which the index is maintained.

For example, in a book index several fields hold text or numbers that represent values for corresponding parameters that include title, author, International Standard Book Number (ISBN), publication date, copyright date, review and rating, among others, in any combination of one or more parameters. Similarly, in a game index, several fields hold text or numbers that represents values for the parameters that include name, game type, vendor, platform on which the game operates and rating, among others, in any combination of one or more.

Figure 2B:
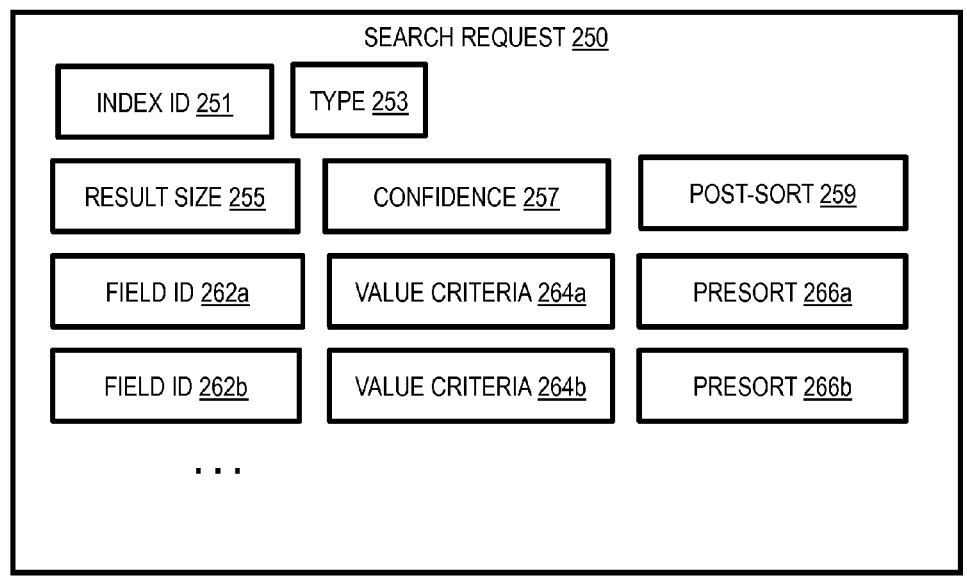
FIG. 2B is a diagram of a search request message, according to an embodiment.
Figure 2C:
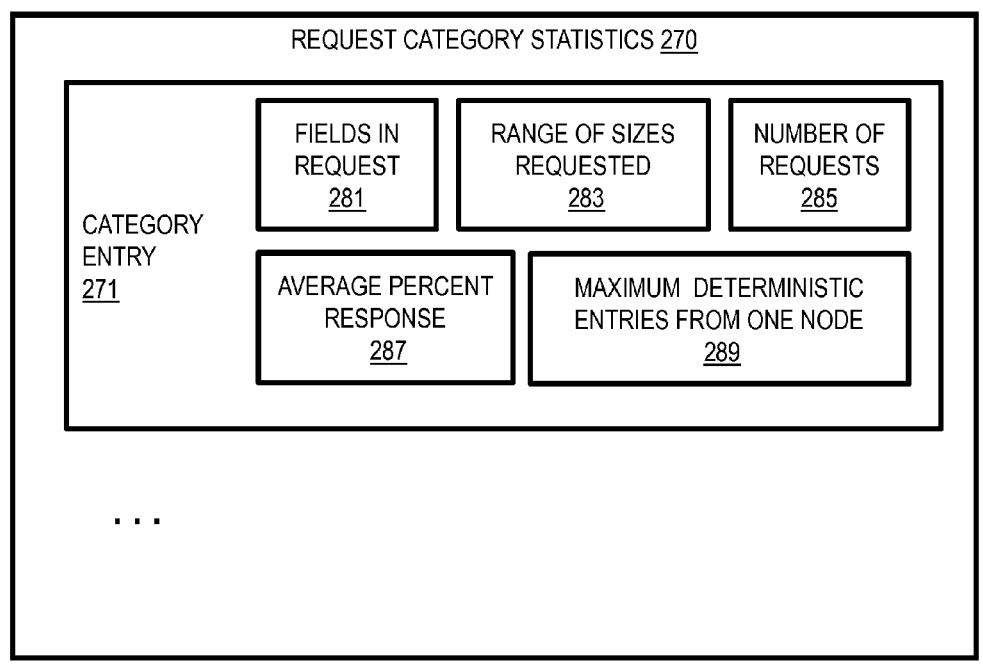
FIG. 2C is a diagram of a request category statistics data structure, according to an embodiment.

Although fields, entries, messages and data structures are depicted in FIG. 2A through FIG. 2C as integral blocks in a particular arrangement for purposes of illustration, in other embodiments, one or more fields, entries, messages, data structures, or portions thereof, are arranged in a different order or in one or more messages or one or more databases on one or more nodes of the communications network, or are omitted, or one or more additional fields, entries or data structures are included.

FIG. 2B is a diagram of a search request message 250, according to an embodiment. A search request message 250 is sent from a network service 110 to the index service 120 to search a particular one of the indices based on some interaction with a UE 101 of a particular user. The index service 120 forwards the request to one of the index nodes of the particular index. That index nodes serves as the aggregator node. If the aggregator node determines that another index node of the same particular index is also to be involved, then a search request 250 is sent from the aggregator index node to one or more other index nodes for the particular index.

In the illustrated embodiment, the search request message 250 includes two or more of an index ID field 251, a type field 253, a result size field 255, a confidence level field 257 and a post-sort field 259 and one or more search criteria. Each search criterion is indicated by a set of fields, such as an index field identifier (ID) field 262a, a value criteria field 264a and a presort condition field 266a. A second criterion is indicated by fields 262b, 264b and 266b. Subsequent criteria, if any, are represented by ellipsis.

The index ID field 251 holds data that indicates which of two or more indices managed by the index service 120 is to be searched. In some embodiments in which the index service 120 maintains only one index, field 251 is omitted. An advantage of specifying the index ID is that one index service 120 can manage multiple indices. The index ID field 251 is an example means to achieve this advantage.

The type field 253 holds data that indicates whether the request message 250 is from a network service 110, or from the index service 120 to the aggregator node, or from the aggregator node to another index node of the same index. An advantage of specifying the type is that an index node that is responding to a request from an aggregator index simply examines its own index partition and does not need to consume computational resources to determine and request contributions from other index nodes. The type field 253 is an example means to achieve this advantage. In some embodiments, there are two distinct interfaces (such as APIs) to each index node 125. One interface is invoked by the client on the aggregator node and the other interface is invoked by the aggregator node on another index node. In such embodiments, neither the aggregator nor the other index node needs to use any IDs to know where the call is coming from and what the response to the call is. In such embodiments, the type field 253 is omitted.

The result size field 255 holds data that indicates a target number T of index entries to return, which all match all the search criteria, i.e., a target number T of matches to return. In some embodiments, the target number of matches is determined independently of the request message, e.g., as a default quantity or by a calculation of the amount of computational power to be consumed in matching the criteria, and field 255 is omitted. An advantage of specifying the target number T is that computational and bandwidth resources are not wasted aggregating and returning an excessive number of matches that neither the network service 110 nor the user of UE 101 desires to parse. The result size field 255 is an example means to achieve this advantage.

The confidence level field 257 holds data that indicates a confidence level for obtaining the single set of matches for a deterministic request. In some embodiments, the confidence level is determined independently of the request message, e.g., as a default quantity or by a calculation of the cost benefit of deviating from 100% confidence, and field 255 is omitted. An advantage of specifying the confidence level is that computational and bandwidth resources are not consumed aggregating and returning matches that are unlikely to contribute to the single set of matches. The confidence level field 257 is an example means to achieve this advantage.

The post sort field 259 holds data that indicates how to sort the index entry matches in a response that includes multiple such matches. For example, the post-sort field 259 holds data that indicates the index fields and ascending or descending orders for sorting the matches.

The index field ID fields 262a, 262b, among others indicated by ellipsis (collectively referenced as index field ID field 262) hold data that indicates one of the fields 212 in an index entry 210. Any method may be used to indicate the index field, e.g., by its ordinal number in the index entry or by its parameter name. For example, the title field in a book index is indicated by the text "Title" or the ordinal number "1."

The value criteria fields 264a, 264b, among others indicated by ellipsis (collectively referenced as value criteria field 264) hold data that indicates one or more values or value ranges to be satisfied by matching index entries. For example, the value criteria field holds data that indicates "includes 'Civil War'" or "excludes 'computer'" or "starts with letters 'Ca' through 'Ebo'." If all values are acceptable, e.g., the field is used only for sorting, then the value criteria includes data that indicates "null" or equivalent or the field is omitted.

The presort fields 266a, 266b among others indicated by ellipsis (collectively referenced as value criteria field 266) hold data that indicates one or more sort criteria for a sort to be performed before a final match set is determined. If there is not a presort criteria, e.g., the index field indicated in field 262 is used only for selection, then the presort field includes data that indicates "None" or equivalent, or the field is omitted. For example, to include the oldest publication dates, the presort field 266 for the publication date field holds data that indicates "oldest" or equivalent. For example, to include the highest rated books, the presort field 266 for the rating field holds data that indicates "highest" or equivalent. Typically, an entry other than "none" or equivalent in any presort field 266 renders the search request of the message 250 deterministic.

FIG. 2C is a diagram of a request category statistics data structure 270, according to an embodiment. The request category statistics data structure 270 is a particular embodiment of request category statistics data structure 156. The request category statistics stored in data structure 270 are used in some embodiments to estimate the number of matches expected from the average node based on the category of the request and past experience. Any method may be used to determine the category. For example, in some embodiments, the network service 110 that forms the request is programmed to only submit a limited range of request types (e.g., by author, or by title and publication date) and each type is assigned a category. In the illustrated embodiment, a request is categorized by the collection of index fields listed in the request message fields 262 of the corresponding request message 250 and the result size, if any, indicated in field 255 of the request message 250. Because a wide range of result sizes can be requested, in the illustrated embodiment, each category includes a range of result sizes, e.g., 1-10, 11-50, 51-100, 101-500, 501-1000, 1001-5000, 5001-10000, or greater than 10000. . In some embodiments, estimates are not based on category statistics; and data structure 159 (including embodiment 270) is omitted.

For each different category of request received by the index service, a category entry field 271 is added to request category statistics data structure 270. Other category entry fields are indicated by ellipsis. Each category entry field 271 includes a list of fields in request field 281, a range of sizes requested field 283, a number of requests field, an average percent response field 287, and a maximum deterministic entries from one node field 289.

The list of fields in request field 281 holds data that indicates a set of all index fields recited in the index field ID fields 262 of any single request message. For example, some request messages include only one index field (e.g., author) and other request messages include more index fields (e.g., title and publication date, or author and rating).

The range of sizes requested field 283 holds data that indicates one of the ranges used to define a category, as described above. For example, the field 283 holds data that indicates the range 501-1000; and requests that indicate in result size field 255 a target size in this range are included in the category.

The number of requests field 285 holds data that indicates the number of requests processed by the index service that fall within the category defined by fields 281 and 283. The more requests serviced for each category, the better the statistics represent the category. In some embodiments, a time of the previously processed requests is also recorded; and the responses to the more recent requests are given more weight.

The average percent response field 287 holds data that indicates the average percent response from one node, i.e., 100% times the number of matches returned from a node divided by the number requested of the node. For example, if one request message indicates a target size T of 500 matches in field 255, but the index node that receives the request only finds 350 matches on its local partition, then the percent response to such a request is 70. This information is passed to the request category statistics module 154 which increments the field 285 and computes a new average percent response for the category. The new average percent response is stored in field 287. In some embodiments, the value in the field 287 is weighted by the number of requests that it represents. For example, if there have been 9 previous requests in the category (as indicted in field 285) that produced an average of 50% response, then adding the 70% response for the most recent request produces a new average of (9*50%+70%)/10=52%.

In some embodiments, as the index grows, the fields 285 and 287 are reset to zero periodically, e.g., every three months, so that the statistics represent the latest state of the index. In some embodiments that include time of request, the fields are not reset, but more recent responses are given more weight.

The maximum deterministic entries from one node field 289 holds data that indicates the most matches that any one partition contributed to a deterministic result for a request in the category. Non-deterministic requests are not included in this statistic. For example, if index entries are distributed randomly across 200 partitions and a deterministic request is received for 600 matches, e.g., for the 600 highest rated books that include Civil War in the title published since 1960, then it is unlikely that all 600 highest rated books are found in one partition. It is more likely that there are on the order of 600/200=3 of the highest rated books in each partition. However, to be 100% confident that the 600 highest rated books are returned in response to the request, in some embodiments, the aggregator node requests the 600 highest rated books from each of the 200 nodes. Assuming that each node has at least 600 such books, as many as 120000 entries are returned to the aggregator, which then sorts them to find the highest rated 600 to return as matches in the response. The aggregator node is in a position to see how many of the 600 matches came from each node. For purposes of illustration, it is assumed that one node contributed 11 of the matches and all other nodes contributed fewer, some even contributing none of the matches. In this example, the most that any one partition contributed to a deterministic result is 11. Continuing with this example, if 11 is greater than the value already stored in field 289, then the value 11 is stored in the field 289. This informs the system 100 that if a deterministic request is received in this category, then it is likely to be sufficient to ask for 11 matches from each node, rather than 600. The obvious advantage is a great reduction in the bandwidth and computation resources consumed on each node. Field 289 is an example means to achieve this advantage.

In other embodiments, more or fewer or different statistics are included in each category entry field 271.

Figure 3B:
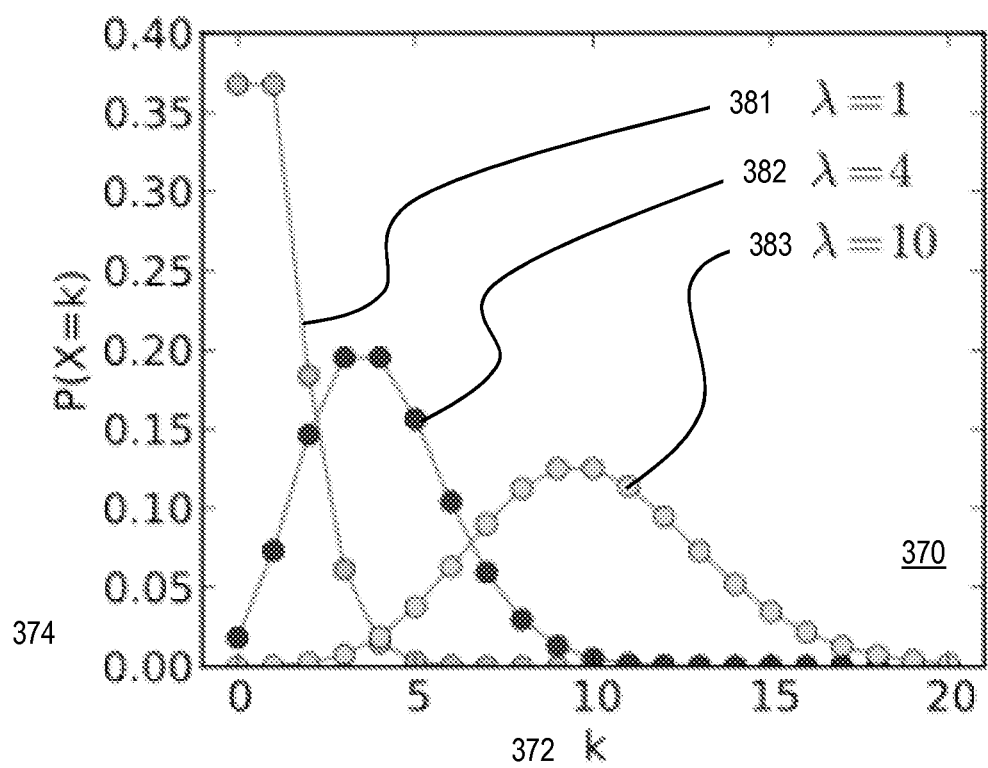
FIG. 3B is a graph that illustrates a Poisson distribution, used according to some embodiments.
Figure 4:
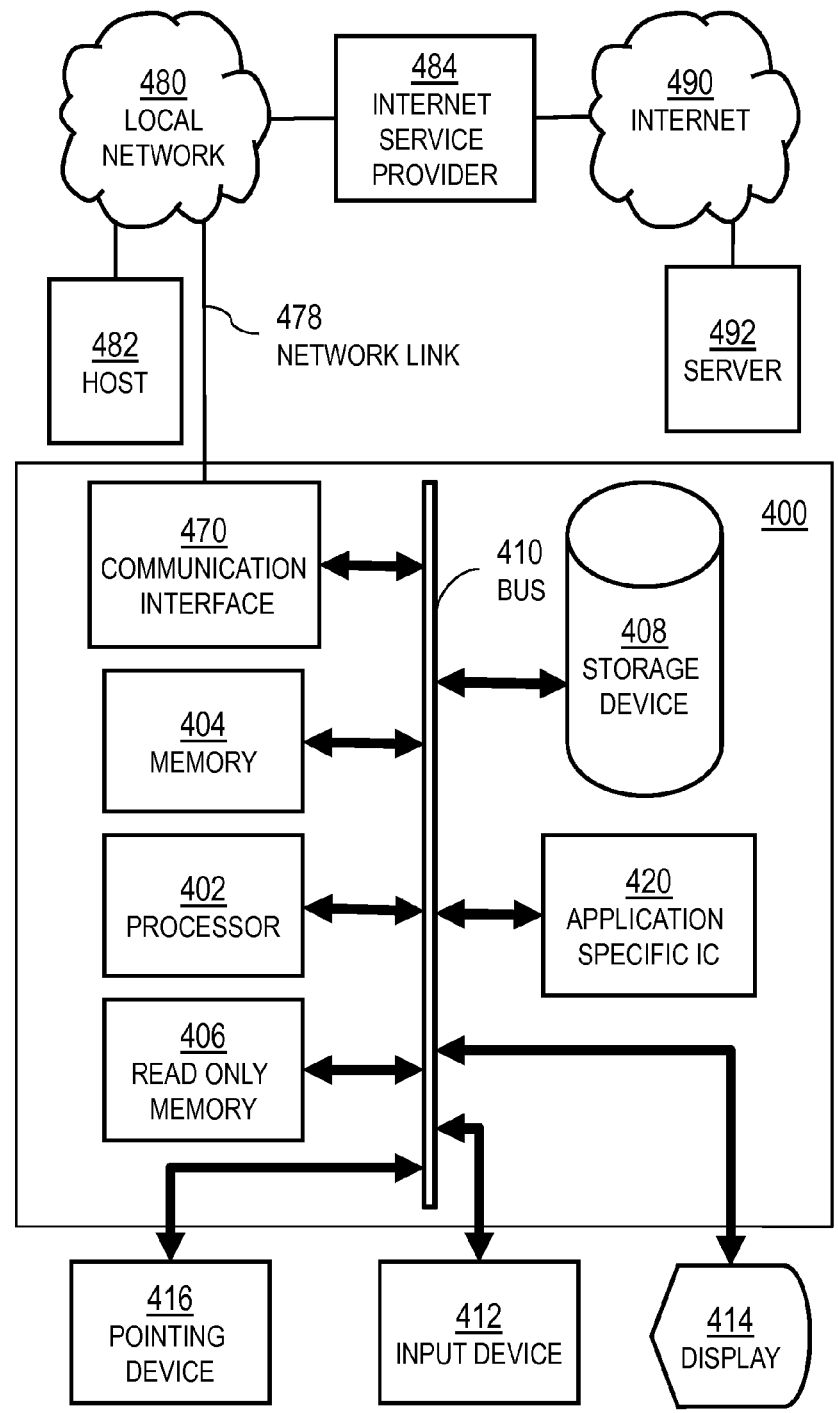
FIG. 4 is a diagram of hardware that can be used to implement an embodiment of the invention.
Figure 5:
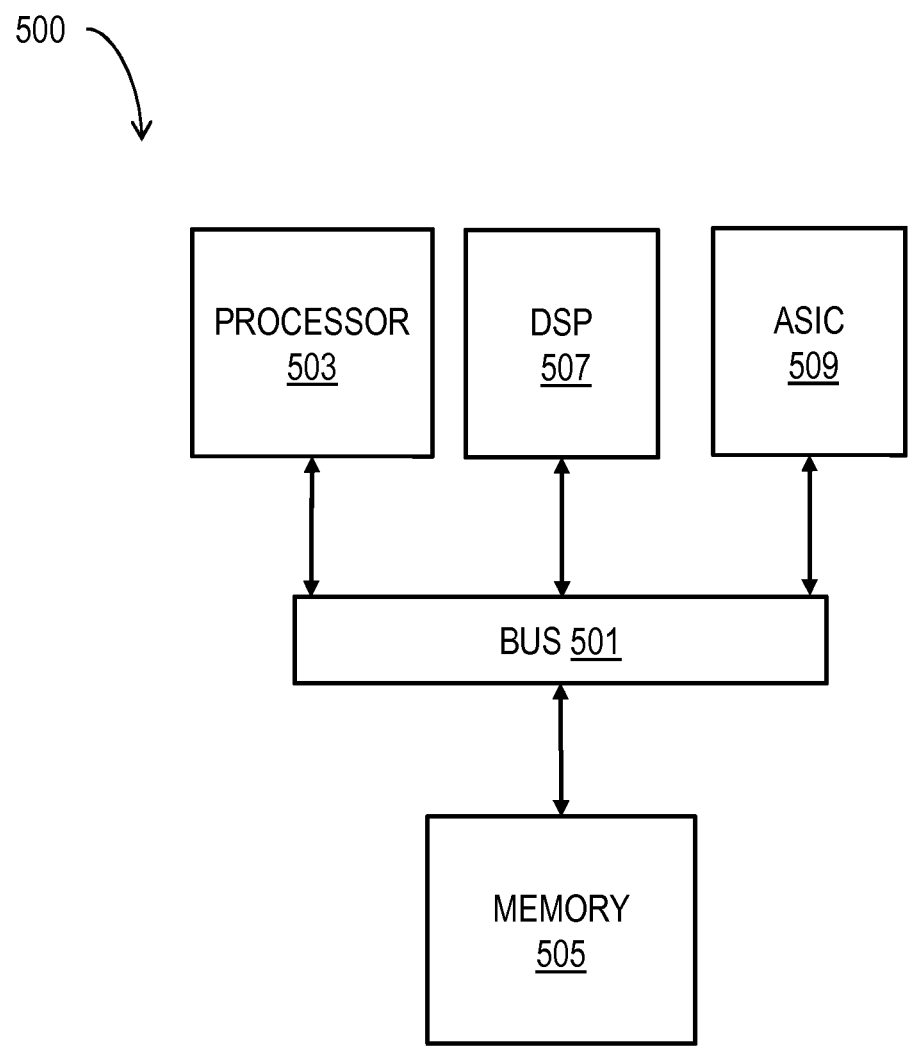
FIG. 5 is a diagram of a chip set that can be used to implement an embodiment of the invention.

FIG. 3A is a flowchart of a process 300 for enhanced processing of search requests directed to a partitioned index, according to one embodiment. In one embodiment, the enhanced node request module 152 performs the process 300 and is implemented in, for instance, a chip set including a processor and a memory as shown in FIG. 5 or general purpose computer 400 as depicted in FIG. 4. In some embodiments, one or more steps involving updating or retrieving statistics from the request category statistics data structure 156 involve the request category statistics module 154 on the index service 120. Although steps are depicted in FIG. 3A as integral blocks in a particular order for purposes of illustration, in other embodiments one or more steps or portions thereof are performed in a different order, or overlapping in time, in series or in parallel, or are omitted or one or more steps are added, or the process is changed in some combination of ways.

In step 301, a search request message is received to search a partitioned index for matches. For example, a search request message 250 is received by enhanced node request module 152 at index node 125*a*. Thus step 301 involves receiving a current request for a search of an index, wherein the index is partitioned across a plurality of a number P of nodes in communication over a network.

A target number T of matches to return in a response is also determined during step 301. In some embodiments, the target number T is specified in the request, e.g., in field 255. In some embodiments, the target number T of matches is inferred, e.g., as a default target size (e.g., 100 matches), or a maximum target size (e.g., 10000 matches) or based on some other programmed logic, such as time of day or congestion on the network or processor utilization on one or more index nodes. Thus, step 301 includes determining a target number T of matches to return in response to the current request.

In step 303, the category of the request is determined. For example, it is determined whether the request is an author search for 1 to 10 books or a title and publication date search for 501 to 1000 books, among other categories. In some embodiments that do not keep request category statistics, step 303 is omitted.

In step 305, it is determined whether the request is from an aggregator node or the index service, e.g., index service 120. If the request is from the index service, then the receiving node is the aggregator node that manages responses from zero or more other nodes for other partitions of the index, as described in more detail below. In various embodiments, it can be determined whether a request message is from an aggregator node by the contents of the type field 253 in the request or by the distinct interface used to send the request. In other embodiments, network addresses of the index service 120 and index nodes 125 are known for one index, and the determination is based on a network address of a source of the message as indicated in a protocol header field (not shown) of the message 250.

If it is determined in step 305 that the request is from an aggregator node, then, in step 307, the local matches to the request criteria are determined, i.e., the matches to the search criteria among the index entries on the local partition are determined. In embodiments that keep request category statistics, the number of matches is recorded in the request category statistics data structure 156, either directly or by reporting the number of matches to a request category statistics module 154. For example, if module 152 on index node 125*a* receives a search request from index node 125*p*, then node 125*p* is the aggregator; and in step 307, module 152 on node 125*a* finds matches to the request on local index partition 127*a*. The target size of number T requested and the local matches of number L are used to compute a response percentage that is included in field 287 of the request category statistics data structure 156. Control then passes to step 355 to sort and send the matches, as described in more detail below.

If it is determined in step 305 that the request is not from an aggregator node, e.g., if the request message is from the index service, then the module 152 on the local node is the aggregator and control passes to step 311 and following. For purposes of illustration, it is assumed that module 152 on index node 125*a* has received a request message from the index service; and thus node 125*a* is the aggregator node.

In step 311, it is determined whether the request is deterministic. For example, it is determined whether any of the presort fields 266 in the request message 250 holds data that is different from "None" or its equivalent. If so, then control passes to step 331 and following, described below. Thus step 311 involves determining whether the current request is deterministic, wherein a search request is deterministic if only one set of index entries completely satisfies the search request. In the steps following 311, a number K of matches to request from each of a number N of nodes of the plurality of nodes is determined based on whether the current request is deterministic.

If it is determined in step 311 that the request is not deterministic, then in step 313 the matches on the local partition are determined. The number L of local matches is found in step 313. Thus, step 313 includes determining a number L of matches on a local partition of a local node of the plurality of nodes. In embodiments that keep request category statistics, the percent response is recorded in the request category statistics data structure 156, either directly or by reporting the response to a request category statistics module 154. For example, a percent response is computed as 100*L/T and used to update the contents of field 287; and field 285 is incremented. A shortage is also computed as a number T−L. Thus, step 313 includes determining a shortage equal to the number T minus the number L. Control passes to step 323 to determine whether enough matches have been found.

In some embodiments, step 313 includes determining the number of matches K to request from each of the other nodes as about equal to or greater than the shortage, so that a single other node might provide all the matches needed. Thus, in some embodiments, K≥(T−L), and step 313 involves determining the number K as greater than or equal to the shortage.

For purposes of illustration, it is assumed that the non-deterministic request is for 600 books with "Civil War" in the title published since 1960, post sorted by publication date. The target number T of entries desired is 600; and the category of the request, if step 303 was not omitted, is title and publication date in size range from 501-1000. During step 313, module 152 on index node 125a searches the local partition 127a for index entries with Civil War in the title and publication date on or after Jan. 1, 1960. For purposes of illustration it is assumed that 360 matches are found (i.e., L=360). The percent response is 100%*360/600=60%; and is incorporated into the request category statistics data structure 156, e.g., incrementing field 285 and updating field 287 of data structure 270. The shortage is then 600−360=240; and K, the number of matches to request form each of one or more other index nodes, is greater than or equal to 240. An advantage of making K greater than the shortage is that some number of duplicate index entries or invalid index entries or other errors can be tolerated without making additional requests.

In step 323, it is determined whether enough matches have been found to satisfy the request. For example, it is determined whether the shortage is not greater than zero. If enough matches have been found, then control passes to step 355 described below to sort and send the response. If not enough matches are found, e.g., if the shortage is greater than zero, then control passes to step 315 and following to determine how many matches K to request from each of how many nodes N of the plurality of P nodes.

In step 315, it is determined whether category statistics are available for the category of the current request, as determined in step 303. If it is determined in step 315 that category statistics are not available, then in step 317 the number N of other index nodes to involve in satisfying the request are determined based on the number L of local matches found. Category statistics are not available if a request category is not determined (e.g., step 303 is omitted), or the number of requests for the category of the current request is too small (e.g., less than about 20).

During step 317, the number N of other index nodes from which to request K matches is determined based on the number L of matches found on the local partition. It is assumed that an average partition contains about the same order of magnitude of matches as L, the number of matches on the local partition. To account for differences in the number of matches from one partition to another, a cushion factor C greater than 1 is introduced and the number N is determined as given by Equation 1.

$$N = \text{CEIL}\{(T-L)*C/L\} \quad (1)$$

where CEIL is a function that outputs the smallest integer that is larger than the argument value within the brackets { }. In various embodiments, the cushion factor C is selected from within a range from about one (1) to about ten (10) and, preferably, is selected from within a range from about two (2) to about five (5). Thus, in some embodiments, step 317 involves determining the number N by dividing a product of the shortage (T−L) and a cushion factor (C) by the number L of matches on the local partition. In at least some embodiments, the cushion factor is greater than one. Control then passes to step 321, described below.

For example, for T=600 and L=360 and C=3, Equation 1 yields N=2. Thus a request for K=240 matches is sent to each of N=2 other index nodes. This offers the advantage of conserving the bandwidth and computational resources of sending the request to 198 other index nodes. By sending the request to N other index nodes in parallel, computing the number N offers the advantage of saving response time that would be consumed if the request for K matches were first sent to one other node, which then returned fewer than K matches and then serially requesting the new remainder from a different index node, until all T matches were obtained.

If it is determined in step 315 that category statistics are available, then in step 319 the number N of other index nodes to involve in satisfying the request are determined based on the statistics. For example, during step 319, the number N of other index nodes from which to request K matches is determined based on the average number of matches previously returned for other requests in the same category, as determined from category statistics. For example, an average A matches are returned from a node in response to previous requests that are similar to the current request. For example, in the illustrated embodiment, the value of A is computed by Equation 2.

$$A = K*Rc \quad 2)$$

where Rc is the relative (percent) response for requests from field 287 of the category entry 271 that corresponds to the category of a forwarded request to be issued by the aggregator node. The forwarded request message 250 to be issued by the aggregator is similar to the current request because it includes all the fields in the field ID fields 262 of the current search request message 250, but the value of K is indicated in the result size field 255 instead of the value of T. Thus, step 319 includes determining an average number A of matches from a node in response to previous requests that are similar to the current request.

For example, the aggregator node facing a shortage of 240 entries for Civil War books after 1960 will generate a request that belongs to the category of title and publication date of size range 101-500. It is assumed for purposes of illustration that such requests experience an average percent response of 52%, as described above. Therefore, according to Equation 2, a request for K=240 matches on average returns A=240*52%=124.8 matches In some embodiments, as described above for step 317, to account for differences in the number of matches from one partition to another, a cushion factor C greater than 1 is introduced. Thus, the cushion factor is greater than one. The number N of nodes from which to request K matches is computed as given by Equation 3.

$$N = \text{CEIL}\{(T-L)*C/A\} \quad (3)$$

Thus, step 319 includes determining the number N by dividing a product of the shortage (T−L) and a cushion factor (C) by the number A.

For example, for T=600 and L=360 and C=3 and A=124.8, as is assumed for purposes of illustration, Equation 3 yields N=6. Thus a request for K=240 matches is sent to each of N=6 other index nodes. This offers the advantage of conserving the bandwidth and computational resources of sending the request to 194 other index nodes. By sending the request to 6 other index nodes in parallel, this offers the advantage of saving response time that would be consumed if the request for 240 matches were first sent to one other node, which then returned fewer than K matches (e.g., about 125 matches) and then serially requesting the new remainder from a different index node, until all T matches were obtained.

In some embodiments that omit step 303, steps 315 and 319 are also omitted.

In step 321, the request for K matches is sent to each of N other index nodes and the responses received with matches from the remote (i.e., non-local) partitions. The returned remote matches are added to those already obtained. A new shortage, if any, is computed by subtracting the aggregated total number of matches from the target number T of matches. Control then passes back to step 323, described above, to determine if sufficient matches have been aggregated to reach the target number T of matches, i.e., if there is a shortage of zero or less. If there is no shortage, then control passes to step 355. In some embodiments, if there is still a shortage after one or two passes through step 323, then a request for any remaining shortage is sent to all remaining index nodes. This offers the advantage of reducing the delay in obtaining a complete response in the occasional circumstances when the estimated numbers of nodes are not sufficient to fully satisfy the request.

In step 355 any matches in excess of the target number T of matches are discarded and the remaining T matches are sorted as indicated by field 259 of the request message 250. In some embodiments, the obtained matches are sorted first, and then the excess matches farthest down the sorted list are discarded. The remaining T matches are sent in response to the current request, e.g., the T matches are sent to index service 120 in one or more response messages. The index service 120 forwards the one or more response messages to the appropriate network service 110.

If it is determined in step 311 that the request is deterministic, then in step 331 it is determined whether the request allows for a probabilistic approach, i.e., it is determined whether the single set of matches for the request must be provided with certainty (confidence level=100%), or probabilistically with a confidence level less than 100%. The determination of K depends on this choice. Thus, step 331 involves determining the number K based on the confidence level. For example, if it is assumed for purposes of illustration that the search request message is for the 600 most highly rated books that included "Civil War" in the title published after 1960, then the request is deterministic. If the request message 250 includes a confidence level in field 257 of less than 100%, then the request is probabilistic. Thus, step 331 involves determining a confidence level that a response is identical to the one set of index entries that completely satisfies the current request. In either case, a request is to be sent to every index node. Thus, if the current request is deterministic, then determining the number K of matches to request from each of the number N of nodes further comprises determining the number N of nodes as equal to the number P of nodes in the plurality of nodes. The number K of matches to request is determined based on the confidence level.

If certainty is requested, e.g., if the confidence field 247 holds data that indicates a confidence level equal to 100%, then control passes to step 351. In step 351, the target number T of matches is requested from all P index nodes of the index, including the local partition and P−1 remote partitions. Thus, according to step 351, if the confidence level is 100%, then the number K is equal to the target number T. In step 353 the local and remote matches are received with T or fewer matches from each index node. Index nodes that return fewer than T matches have partitions that contain fewer than T matches. Index nodes of partitions with T or more matches, return the T presorted matches, e.g., the T oldest or T highest rated or whatever the presort field 266 of the request from the aggregator indicates. Step 353 includes aggregating and sorting the up to P*T entries and selecting the aggregated T matches. Control passes to step 355, described above to post sort and send the aggregated T matches.

For example, if certainty is requested, then the 600 highest ranked books published after 1960 with "Civil War" in the title are retrieved from the local partition and requested from each of the other 199 index nodes. In step 353 up to 120,000 index entries are received from the local and remote partitions. In 355 the up to 120,000 entries are sorted, keeping only the most highly rated 600. Those 600 are post sorted, e.g., by publication date, and sent in one or more response messages to the index service 120 for forwarding to the appropriate network service 110.

If, however, it is determined, in step 331, that a probabilistic approach is allowed, then fewer than T matches will be requested from each index node, depending on statistics or an assumed random distribution of index entries across the P partitions. For example, if the confidence field 257 indicates a confidence level less than 100% or the field 257 is absent, then the probabilistic approach is allowed. For example, on average 3 matches from each partition should be among the 600 most highly rated (600 requested divided randomly across 200 nodes). The larger the number of matches requested form each index node, the more probable that the 600 retained are identical to the single set that satisfied the request.

In step 333, it is determined whether category statistics are available for the category of the current request, as determined in step 303. If it is determined in step 333 that category statistics are not available, then in step 339 the number K of matches to request from each index nodes is determined based on the assumption that the index entries are distributed randomly with respect to any of the index fields involved in the current search. Category statistics are not available if a request category is not determined (e.g., step 303 is omitted), or the number of requests for the category of the current request is too small (e.g., less than about 20).

During step 339, the number K of matches to request from every index node is determined based on the assumption that the distribution of index entries across the P partitions is random. The expected average number of deterministic matches (i.e., the matches that are members of the one set of index entries that satisfy the search criteria completely) per partition is known to be T/P (represented by the symbol $\lambda$ herein). If K is selected to be equal to the expected number $\lambda$, however, a large number, about half, of the partitions will have fewer than the expected number of deterministic matches. The larger is the value of K, the more likely it will include the deterministic matches in a partition. To account for differences in the number of deterministic matches from one partition to another, a deterministic cushion factor D greater than 1 is introduced. The value of K is selected according to Equation 4.

$$K=\text{CEIL}\{(T/P)*D\}=\text{CEIL}\{\lambda*D\} \qquad (4)$$

In various embodiments, the deterministic cushion factor D is selected from within a range from about P/10 to about P/2. In a preferred embodiment, D is about P/5. Control then passes to step 341, described below. Thus, according to Equation 4 in step 339, if the confidence level is less than 100%, then the number K is equal to a product of a cushion factor D times a ratio of the target number T divided by the number P of nodes in the plurality of nodes.

In some embodiments, the deterministic cushion factor D depends on the confidence level indicated in the confidence field 257. For example, in some embodiments, the deterministic cushion factor is given by Equation 5.

$$D=P/[(100-\text{confidence level})+1] \qquad (5)$$

In other embodiments, a Poisson distribution is used to select D. The Poisson distribution is a discrete probability distribution that expresses the probability of a number of events (deterministic matches) occurring in an interval (e.g., a partition) if these events occur with a known average rate (e.g., $\lambda$=T/P) and independently of interval. Thus the Poisson distribution can be used to estimate the confidence level that a particular value of K will include the deterministic matches. FIG. 3B is a graph 370 that illustrates a Poisson distribution, used in some embodiments. The horizontal axis is the number of occurrences of a random event and the vertical axis is the probability of that number of occurrences during an interval (e.g., in a partition). Trace 381 shows the Poisson distribution when the expected number of occurrence in an interval (λ) is 1. Trace 382 shows the Poisson distribution when the expected number of occurrence in an interval (λ) is 4. Trace 383 shows the Poisson distribution when the expected number of occurrence in an interval (λ) is 10.

As can be seen from trace 382, when λ, the expected number of deterministic matches in an interval, is 4, there is substantial probability that an individual interval will have zero through 10 deterministic matches. But the probability of more than ten matches is very small. If this small remaining probability is multiplied by the number P of partitions, the probability that using 10 matches per partition (D=10/4=2.5) will miss one or more deterministic matches can be computed. It is estimated that the chances of missing a deterministic match in this case is less than about 10%. Thus, according to some embodiments, the value of D is computed so that the probability of missing one or more deterministic matches based on the Poisson distribution is about equal to the difference between 100% and the confidence interval indicated in field 257.

In other embodiments, other probability distributions are used. Thus, in various embodiments, step 339 involves a cushion factor that is greater than one by an amount that depends on the confidence level.

For example, for T=600 and P=200 and D=P/5=40, Equation 4 yields K=120. Thus a request for K=120 matches is sent to each of P−1 other index nodes and the 120 highest rated entries are retrieved from the local partition. This offers the advantage of conserving the bandwidth and computational resources of sending a request for 600 matches to all the other index nodes. Using the Poisson distribution to deduce a value of D=2.5, Equation 4 yields K=8, a much more efficient number, associated with a confidence level over 90%.

If it is determined in step 333 that category statistics are available, then in step 335 the number K of matches to request from every index node is determined based on the statistics. For example, during step 335, the number K of matches is determined based on a number M of maximum contributions from one node in response to previous deterministic requests for 100% confidence, wherein the previous requests are similar to the current request. This value is stored in field 289 of request category statistics data structure 270. Thus, in some embodiments, determining the number K of matches to request from each of the number N of nodes further comprises determining the number K based on the number M.

For example, the aggregator node responding to a request for the 600 most highly rated entries for Civil War books after 1960 will generate a request that belongs to the category of title and publication date and rating with size range 501-1000. It is assumed for purposes of illustration that such requests experienced a maximum number of 11 deterministic matches from a single node.

In some embodiments, to account for differences in the number of matches from one partition to another and one request to another, a cushion factor C greater than 1 is introduced. The number N of nodes from which to request K matches is computed as given by Equation 6.

$$K = \text{CEIL}\{M*C\} \quad (6)$$

For example, for M=11 and C=2, Equation 6 yields K=21. Thus a request for K=21 matches is sent to each index node. This offers the advantage of conserving the bandwidth and computational resources of sending a request for 600 matches to all 200 index nodes.

In some embodiments that omit step 303, steps 333 and 335 are also omitted.

In step 341, the request for K matches is processed locally and sent to each of P−1 other index nodes and the responses received providing matches from the remote (i.e., non-local) partitions. The returned remote matches are added to the local matches. A shortage, if any, is computed by subtracting the aggregated total number of matches from the target number T of matches. Control then passes to step 343 to determine if sufficient matches have been aggregated to reach the target number T of matches, i.e., if there is a shortage of zero or less. If there is no shortage, then control passes to step 355, described above. In some embodiments, if there is still a shortage after one or two passes through step 333, then a request for K=T matches is sent to all index nodes. This offers the advantage of reproducing a useful result even if the probabilistic approach falls short in some rare instances.

The processes described herein for processing of search requests directed to a partitioned index may be advantageously implemented via software, hardware, firmware or a combination of software and/or firmware and/or hardware. For example, the processes described herein may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 4 illustrates a computer system 400 upon which an embodiment of the invention may be implemented. Although computer system 400 is depicted with respect to a particular device or equipment, it is contemplated that other devices or equipment (e.g., network elements, servers, etc.) within FIG. 4 can deploy the illustrated hardware and components of system 400. Computer system 400 is programmed (e.g., via computer program code or instructions) to process search requests directed to a partitioned index as described herein and includes a communication mechanism such as a bus 410 for passing information between other internal and external components of the computer system 400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 400, or a portion thereof, constitutes a means for performing one or more steps of processing of search requests directed to a partitioned index.

A bus 410 includes one or more parallel conductors of information so that information is transferred quickly among devices coupled to the bus 410. One or more processors 402 for processing information are coupled with the bus 410.

A processor (or multiple processors) 402 performs a set of operations on information as specified by computer program code related to processing of search requests directed to a partitioned index. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 410 and placing information on the bus 410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 400 also includes a memory 404 coupled to bus 410. The memory 404, such as a random access memory (RAM) or other dynamic storage device, stores information including processor instructions for processing of search requests directed to a partitioned index. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of processor instructions. The computer system 400 also includes a read only memory (ROM) 406 or other static storage device coupled to the bus 410 for storing static information, including instructions, that is not changed by the computer system 400. Some memory is composed of volatile storage that loses the information stored thereon when power is lost. Also coupled to bus 410 is a non-volatile (persistent) storage device 408, such as a magnetic disk, optical disk or flash card, for storing information, including instructions, that persists even when the computer system 400 is turned off or otherwise loses power.

Information, including instructions for processing of search requests directed to a partitioned index, is provided to the bus 410 for use by the processor from an external input device 412, such as a keyboard containing alphanumeric keys operated by a human user, or a sensor. A sensor detects conditions in its vicinity and transforms those detections into physical expression compatible with the measurable phenomenon used to represent information in computer system 400. Other external devices coupled to bus 410, used primarily for interacting with humans, include a display device 414, such as a cathode ray tube (CRT) or a liquid crystal display (LCD), or plasma screen or printer for presenting text or images, and a pointing device 416, such as a mouse or a trackball or cursor direction keys, or motion sensor, for controlling a position of a small cursor image presented on the display 414 and issuing commands associated with graphical elements presented on the display 414. In some embodiments, for example, in embodiments in which the computer system 400 performs all functions automatically without human input, one or more of external input device 412, display device 414 and pointing device 416 is omitted.

In the illustrated embodiment, special purpose hardware, such as an application specific integrated circuit (ASIC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a one-way or two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends or receives or both sends and receives electrical, acoustic or electromagnetic signals, including infrared and optical signals, that carry information streams, such as digital data. For example, in wireless handheld devices, such as mobile telephones like cell phones, the communications interface 470 includes a radio band electromagnetic transmitter and receiver called a radio transceiver. In certain embodiments, the communications interface 470 enables connection to the communication network 105 for processing of search requests directed to a partitioned index to the UE 101.

The term "computer-readable medium" as used herein refers to any medium that participates in providing information to processor 402, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 408. Volatile media include, for example, dynamic memory 404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 420.

Network link 478 typically provides information communication using transmission media through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490.

A computer called a server host 492 connected to the Internet hosts a process that provides a service in response to information received over the Internet. For example, server host 492 hosts a process that provides information representing video data for presentation at display 414. It is contemplated that the components of system 400 can be deployed in various configurations within other computer systems, e.g., host 482 and server 492.

At least some embodiments of the invention are related to the use of computer system 400 for implementing some or all of the techniques described herein. According to one embodiment of the invention, those techniques are performed by computer system 400 in response to processor 402 executing one or more sequences of one or more processor instructions contained in memory 404. Such instructions, also called computer instructions, software and program code, may be read into memory 404 from another computer-readable medium such as storage device 408 or network link 478. Execution of the sequences of instructions contained in memory 404 causes processor 402 to perform one or more of the method steps described herein. In alternative embodiments, hardware, such as ASIC 420, may be used in place of or in combination with software to implement the invention. Thus, embodiments of the invention are not limited to any specific combination of hardware and software, unless otherwise explicitly stated herein.

The signals transmitted over network link 478 and other networks through communications interface 470, carry information to and from computer system 400. Computer system 400 can send and receive information, including program code, through the networks 480, 490 among others, through network link 478 and communications interface 470. In an example using the Internet 490, a server host 492 transmits program code for a particular application, requested by a message sent from computer 400, through Internet 490, ISP equipment 484, local network 480 and communications interface 470. The received code may be executed by processor 402 as it is received, or may be stored in memory 404 or in storage device 408 or other non-volatile storage for later execution, or both. In this manner, computer system 400 may obtain application program code in the form of signals on a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to a signal on an infra-red carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

FIG. 5 illustrates a chip set or chip 500 upon which an embodiment of the invention may be implemented. Chip set 500 is programmed to process search requests directed to a partitioned index as described herein and includes, for instance, the processor and memory components described with respect to FIG. 4 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 500 can be implemented in a single chip. It is further contemplated that in certain embodiments the chip set or chip 500 can be implemented as a single "system on a chip." It is further contemplated that in certain embodiments a separate ASIC would not be used, for example, and that all relevant functions as disclosed herein would be performed by a processor or processors. Chip set or chip 500, or a portion thereof, constitutes a means for performing one or more steps of providing user interface navigation information associated with the availability of functions. Chip set or chip 500, or a portion thereof, constitutes a means for performing one or more steps of processing of search requests directed to a partitioned index.

In one embodiment, the chip set or chip 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 500 includes merely one or more processors and some software and/or firmware supporting and/or relating to and/or for the one or more processors.

The processor 503 and accompanying components have connectivity to the memory 505 via the bus 501. The memory 505 includes both dynamic memory (e.g., RAM, magnetic disk, writable optical disk, etc.) and static memory (e.g., ROM, CD-ROM, etc.) for storing executable instructions that when executed perform the inventive steps described herein to process search requests directed to a partitioned index. The memory 505 also stores the data associated with or generated by the execution of the inventive steps.

Figure 6:
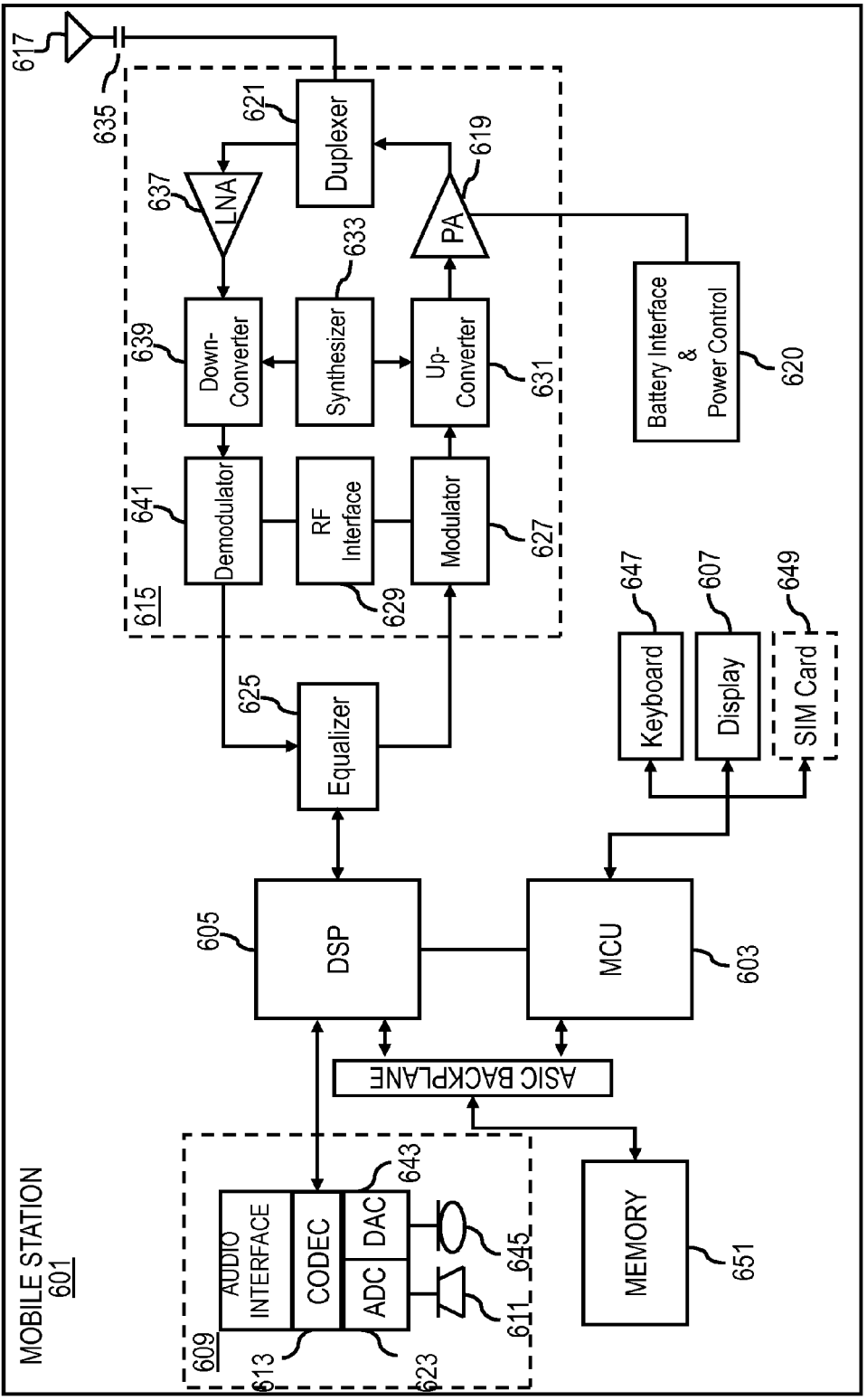
FIG. 6 is a diagram of a mobile terminal (e.g., handset) that can be used to implement an embodiment of the invention.

FIG. 6 is a diagram of exemplary components of a mobile terminal (e.g., handset) for communications, which is capable of operating in the system of FIG. 1, according to one embodiment. In some embodiments, mobile terminal 601, or a portion thereof, constitutes a means for performing one or more steps of processing of search requests directed to a partitioned index. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 603, a Digital Signal Processor (DSP) 605, and a receiver/transmitter unit including a microphone gain control unit and a speaker gain control unit. A main display unit 607 provides a display to the user in support of various applications and mobile terminal functions that perform or support the steps of processing of search requests directed to a partitioned index. The display 607 includes display circuitry configured to display at least a portion of a user interface of the mobile terminal (e.g., mobile telephone). Additionally, the display 607 and display circuitry are configured to facilitate user control of at least some functions of the mobile terminal. An audio function circuitry 609 includes a microphone 611 and microphone amplifier that amplifies the speech signal output from the microphone 611. The amplified speech signal output from the microphone 611 is fed to a coder/decoder (CODEC) 613.

A radio section 615 amplifies power and converts frequency in order to communicate with a base station, which is included in a mobile communication system, via antenna 617. The power amplifier (PA) 619 and the transmitter/modulation circuitry are operationally responsive to the MCU 603, with an output from the PA 619 coupled to the duplexer 621 or circulator or antenna switch, as known in the art. The PA 619 also couples to a battery interface and power control unit 620.

In use, a user of mobile terminal 601 speaks into the microphone 611 and his or her voice along with any detected background noise is converted into an analog voltage. The analog voltage is then converted into a digital signal through the Analog to Digital Converter (ADC) 623. The control unit 603 routes the digital signal into the DSP 605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 625 for compensation of any frequency-dependent impairments that occur during transmission though the air such as phase and amplitude distortion. After equalizing the bit stream, the modulator 627 combines the signal with a RF signal generated in the RF interface 629. The modulator 627 generates a sine wave by way of frequency or phase modulation. In order to prepare the signal for transmission, an up-converter 631 combines the sine wave output from the modulator 627 with another sine wave generated by a synthesizer 633 to achieve the desired frequency of transmission. The signal is then sent through a PA 619 to increase the signal to an appropriate power level. In practical systems, the PA 619 acts as a variable gain amplifier whose gain is controlled by the DSP 605 from information received from a network base station. The signal is then filtered within the duplexer 621 and optionally sent to an antenna coupler 635 to match impedances to provide maximum power transfer. Finally, the signal is transmitted via antenna 617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 601 are received via antenna 617 and immediately amplified by a low noise amplifier (LNA) 637. A down-converter 639 lowers the carrier frequency while the demodulator 641 strips away the RF leaving only a digital bit stream. The signal then goes through the equalizer 625 and is processed by the DSP 605. A Digital to Analog Converter (DAC) 643 converts the signal and the resulting output is transmitted to the user through the speaker 645, all under control of a Main Control Unit (MCU) 603—which can be implemented as a Central Processing Unit (CPU) (not shown).

The MCU 603 receives various signals including input signals from the keyboard 647. The keyboard 647 and/or the MCU 603 in combination with other user input components (e.g., the microphone 611) comprise a user interface circuitry for managing user input. The MCU 603 runs a user interface software to facilitate user control of at least some functions of the mobile terminal 601 to process search requests directed to a partitioned index. The MCU 603 also delivers a display command and a switch command to the display 607 and to the speech output switching controller, respectively. Further, the MCU 603 exchanges information with the DSP 605 and can access an optionally incorporated SIM card 649 and a memory 651. In addition, the MCU 603 executes various control functions required of the terminal. The DSP 605 may, depending upon the implementation, perform any of a variety of conventional digital processing functions on the voice signals. Additionally, DSP 605 determines the background noise level of the local environment from the signals detected by microphone 611 and sets the gain of microphone 611 to a level selected to compensate for the natural tendency of the user of the mobile terminal 601.

The CODEC 613 includes the ADC 623 and DAC 643. The memory 651 stores various data including call incoming tone data and is capable of storing other data including music data received via, e.g., the global Internet. The software module could reside in RAM memory, flash memory, registers, or any other form of writable storage medium known in the art. The memory device 651 may be, but not limited to, a single memory, CD, DVD, ROM, RAM, EEPROM, optical storage, or any other non-volatile storage medium capable of storing digital data.

An optionally incorporated SIM card 649 carries, for instance, important information, such as the cellular phone number, the carrier supplying service, subscription details, and security information. The SIM card 649 serves primarily to identify the mobile terminal 601 on a radio network. The card 649 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
 receiving a request for a search of an index, wherein the index is partitioned across a plurality of nodes;
 determining whether the request is deterministic based, at least in part, on a sorting criteria included in the request, wherein the request is deterministic if no more than a predetermined number of sets of index entries satisfies the request;
 determining a number of responses to request from at least one of the plurality of nodes in an instance in which the request is deterministic; and
 determining one or more index entries on a local partition of a local node of the plurality of nodes that satisfy the request in an instance in which the request is not deterministic.

2. A method of claim 1, further comprising:
 determining a target number of responses to return in response to the request.

3. A method of claim 2, wherein, if the request is deterministic, then determining the number of responses to request further comprises:
 determining a target number of responses to return in response to the request;
 determining a confidence level that a response is at least substantially identical to one of the limited number of sets of index entries; and
 determining the number of responses to request from substantively all nodes of the plurality of nodes based, at least in part, on the confidence level.

4. A method of claim 3, wherein, if the confidence level is at least substantively equal to 100%, then the number of responses to request is at least substantively equal to the target number of responses.

5. A method of claim 3, wherein, if the confidence level is less than 100%, then the number of responses to request is at least substantively equal to a product of a cushion factor times a ratio of the target number of responses divided by a number nodes in the plurality of nodes.

6. A method of claim 5, wherein, the cushion factor is greater than one by an amount that depends, at least in part, on the confidence level.

7. A method of claim 3, further comprising:
 determining a maximum number of contributions from at least another one of the plurality of nodes in response to at least one similar previous deterministic request for substantively 100% confidence,
 wherein the determining of the number of responses to request is further based, at least in part, on the maximum number of contributions.

8. A method of claim 1, wherein the predetermined number is one.

9. A method of claim 1, wherein the responses are based, at least in part, on one or more matches from the search of the index.

10. A method of claim 1, wherein, if the request is not deterministic, then determining the number of responses to request further comprises:
 determining a target number of responses to return in response to the request;
 determining a number of responses on the local partition of the local node of the plurality of nodes; and
 determining a shortage based, at least in part, on the target number of responses and the number of responses on the local partition.

11. A method of claim 10, wherein determining the number of responses to request further comprises determining whether the number of responses to request is greater than or equal to the shortage.

12. A method of claim 10, wherein determining the number of responses to request further comprises determining the number of responses to request by dividing a product of the shortage and a cushion factor by the number of responses on the local partition.

13. A method of claim 12, wherein the cushion factor is greater than one.

14. A method of claim 10, further comprising:
 determining an average number of responses from a node in response to one or more similar previous requests; and
 determining a number of the plurality of nodes from which to determine the number of responses to request by dividing a product of the shortage and a cushion factor by the average number of responses.

15. An apparatus comprising:
 at least one processor; and
 at least one memory including computer program code for one or more programs,
 the at least one memory and the computer program code configured to, with the at least one processor, cause the apparatus to perform at least the following,
  receive a request for a search of an index, wherein the index is partitioned across a plurality of nodes;
  determine whether the request is deterministic based, at least in part, on a sorting criteria included in the request, wherein the request is deterministic if no more than a predetermined number of sets of index entries satisfies the request;
  determine a number of responses to request from at least one of the plurality of nodes in an instance in which the request is deterministic; and determine one or more index entries on a local partition of a local node of the plurality of nodes that satisfy the request in an instance in which the request is not deterministic.

16. An apparatus of claim 15, wherein the apparatus is further caused to perform:
    determine a target number of responses to return in response to the request.

17. An apparatus of claim 16, wherein, if the request is deterministic, then determining the number of responses to request from each of the number of nodes further causes the apparatus to:
    determine a target number of responses to return in response to the request;
    determine a confidence level that a response is at least substantively identical to the limited number of sets of index entries; and
    determine the number of responses to request from substantively all nodes of the plurality of nodes based, at least in part, on the confidence level.

18. An apparatus of claim 15, wherein the responses are based, at least in part, on one or more matches from the search of the index.

19. An apparatus of claim 15, wherein, if the request is not deterministic, then determining the number of responses to request further causes the apparatus to:
    determine a target number of responses to return in response to the request;
    determine a number of responses on the local partition of the local node of the plurality of nodes; and
    determine a shortage based, at least in part, on the target number of responses and the number of responses on the local partition.

20. An apparatus of claim 19, wherein determining the number of responses to request further comprises determining the number of responses to request by dividing a product of the shortage and a cushion factor by the number of responses on the local partition.

* * * * *